(12) United States Patent
Parkvall et al.

(10) Patent No.: US 9,743,405 B2
(45) Date of Patent: *Aug. 22, 2017

(54) FLEXIBLE SUBFRAMES

(71) Applicant: Telefonaktiebolaget LM Ericsson (publ), Stockholm (SE)

(72) Inventors: Stefan Parkvall, Stockholm (SE); David Astely, Bromma (SE); Erik Dahlman, Bromma (SE); Johan Nyström, Uppsala (SE); Imadur Rahman, Sollentuna (SE); Yngve Selén, Uppsala (SE); Johan Sköld, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,637

(22) Filed: Apr. 18, 2016

(65) Prior Publication Data

US 2016/0234839 A1    Aug. 11, 2016

Related U.S. Application Data

(63) Continuation of application No. 14/036,471, filed on Sep. 25, 2013, now Pat. No. 9,319,130, which is a (Continued)

(51) Int. Cl.
*H04W 72/04* (2009.01)
*H04B 7/26* (2006.01)
*H04L 5/14* (2006.01)

(52) U.S. Cl.
CPC ...... *H04W 72/0446* (2013.01); *H04B 7/2643* (2013.01); *H04B 7/2656* (2013.01); *H04L 5/14* (2013.01); *H04W 72/0406* (2013.01)

(58) Field of Classification Search
None
See application file for complete search history.

(56) References Cited

U.S. PATENT DOCUMENTS

2009/0201838 A1    8/2009  Zhang et al.
2010/0290369 A1*  11/2010  Hui ............ H04B 7/2656
                                                370/279
(Continued)

FOREIGN PATENT DOCUMENTS

CA    2162753    11/1995
EP    0720405    7/1996
(Continued)

OTHER PUBLICATIONS

Source: Ericsson, Nokia, Siemens: Title: Additional Flexibility for the ARIB WCDMA TDD mode: FPLMTS Study Committee, Air-interface WG, SWG2, Document No. AIF/SWG2-16-44. Mar. 30, 1998.
(Continued)

*Primary Examiner* — Chirag Shah
*Assistant Examiner* — Srinivasa Reddivalam
(74) *Attorney, Agent, or Firm* — Baker Botts, LLP

(57) ABSTRACT

The technology disclosed provides the ability for a subframe to be configured as a "flexible" subframe. As a result, at least three different types of subframes in a TDD system may be configured: a downlink ("DL") subframe, an uplink ("UL") subframe, and a "flexible" subframe. While the DL and UL subframes are preconfigured for each frame instance, the flexible subframes are dynamically allocated to be an uplink subframe in one instance of a frame and a downlink subframe in another instance of the frame.

8 Claims, 9 Drawing Sheets

Related U.S. Application Data continuation of application No. 12/816,821, filed on Jun. 16, 2010, now Pat. No. 8,559,343.

(60) Provisional application No. 61/289,655, filed on Dec. 23, 2009.

(56) References Cited

U.S. PATENT DOCUMENTS

| | | | |
|---|---|---|---|
| 2011/0149813 A1 | 6/2011 | Parkvall et al. | |
| 2011/0149894 A1 | 6/2011 | Luo et al. | |
| 2011/0176461 A1 | 7/2011 | Astely et al. | |
| 2011/0211503 A1 | 9/2011 | Che et al. | |
| 2012/0063381 A1* | 3/2012 | Huang | H04W 72/005 370/312 |

FOREIGN PATENT DOCUMENTS

| | | |
|---|---|---|
| EP | 0948149 | 10/1999 |
| JP | 08-289360 | 11/1996 |
| WO | 01/99454 | 12/2001 |
| WO | 2009/120701 | 10/2009 |
| WO | 2010/049587 | 10/2009 |

OTHER PUBLICATIONS

Source: Ericsson, Nokia, Siemens; Title: Modified Uplink Transmission Scheme of WCDMA TDD to support direct MS-to-MS communication; FPLMTS Study Committee, Air-Interface WG, SWG2, Document No. AIF/SWG2-16-44. Mar. 30, 1998.

3GPP TSG-RAN WG1 #58bis (R1-094199) Miyazaki, Japan; Title: Specification Impact of Almost Blank Subframesl Oct. 12, 2009.

3GPP TSG RAN WG#51 Text Proposal for TDD FS1 Frame Configurations (36.211); Jiju, South Korea, Nov. 5-9, 2007, Tdoc R1-074931.

International Search Report and Written Opinion mailed Jun. 10, 2011, in corresponding International Application No. PCT/IB2010/055346.

International Search Report and Written Opinion mailed Aug. 4, 2011, in corresponding International Application No. PCT/SE2010/051305.

Indonesian Office Action regarding Patent Application No. W00201202925, Jun. 14, 2016 (with translation).

* cited by examiner

FLEXIBLE SUBFRAMES

CROSS-REFERENCE TO RELATED APPLICATIONS

This application is a continuation, under 35 U.S.C. §120, of U.S. patent application Ser. No. 14/036,471 filed Sep. 25, 2013, which is a continuation of U.S. patent application Ser. No. 12/816,821, filed Jun. 16, 2010, allowed, which claims priority from U.S. Provisional Patent Application No. 61/289,655, filed Dec. 23, 2009, the entire contents of which are incorporated herein by reference.

BACKGROUND

The technology pertains to telecommunications, and particularly, to a frame structure and a method and apparatus for configuring a frame structure.

In a typical cellular radio system, radio or wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

In some radio access networks, several base stations may be connected (e.g., by landlines or microwave) to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). UTRAN is essentially a radio access network using wideband code division multiple access for user equipment units (UEs).

In a forum known as the Third Generation Partnership Project (3GPP), telecommunications suppliers propose and agree upon standards for third generation networks and UTRAN specifically, and investigate enhanced data rate and radio capacity. The Third Generation Partnership Project (3GPP) has undertaken to evolve further the UTRAN and GSM based radio access network technologies. The first release for the Evolved Universal Terrestrial Radio Access Network (E-UTRAN) specification has issued, and as with most specification, the standard is likely to evolve. The Evolved Universal Terrestrial Radio Access Network (E-UTRAN) comprises the Long Term Evolution (LTE) and System Architecture Evolution (SAE).

Long Term Evolution (LTE) is a variant of a 3GPP radio access technology where the radio base station nodes are connected to a core network (via Access Gateways (AGWs)) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has what is sometimes termed a "flat" architecture including radio base station nodes without reporting to radio network controller (RNC) nodes.

Transmission and reception from a node, e.g., a radio terminal like a UE in a cellular system such as LTE, can be multiplexed in the frequency domain or in the time domain (or combinations thereof). In Frequency Division Duplex (FDD), as illustrated to the left in FIG. 1, downlink and uplink transmission take place in different, sufficiently separated, frequency bands. In Time Division Duplex (TDD), as illustrated to the right in FIG. 1, downlink and uplink transmission take place in different, non-overlapping time slots. Thus, TDD can operate in unpaired frequency spectrum, whereas FDD requires paired frequency spectrum.

Typically, a transmitted signal in a communication system is organized in some form of frame structure. For example, LTE uses ten equally-sized subframes 0-9 of length 1 ms per radio frame as illustrated in FIG. 2.

In the case of FDD operation (illustrated in the upper part of FIG. 2), there are two carrier frequencies, one for uplink transmission (fUL) and one for downlink transmission (fDL). At least with respect to the radio terminal in a cellular communication system, FDD can be either full duplex or half duplex. In the full duplex case, a terminal can transmit and receive simultaneously, while in half-duplex operation (see FIG. 1), the terminal cannot transmit and receive simultaneously (although the base station is capable of simultaneous reception/transmission, i.e., receiving from one terminal while simultaneously transmitting to another terminal). In LTE, a half-duplex radio terminal monitors/receives in the downlink except when explicitly instructed to transmit in the uplink in a certain subframe.

In the case of TDD operation (illustrated in the lower part of FIG. 2), there is only a single carrier frequency, and uplink and downlink transmissions are separated in time also on a cell basis. Because the same carrier frequency is used for uplink and downlink transmission, both the base station and the mobile terminals need to switch from transmission to reception and vice versa. An important aspect of a TDD system is to provide a sufficiently large guard time where neither downlink nor uplink transmissions occur in order to avoid interference between uplink and downlink transmissions. For LTE, special subframes (subframe 1 and, in some cases, subframe 6) provide this guard time. A TDD special subframe is split into three parts: a downlink part (DwPTS), a guard period (GP), and an uplink part (UpPTS). The remaining subframes are either allocated to uplink or downlink transmission.

Time division duplex (TDD) allows for different asymmetries in terms of the amount of resources allocated for uplink and downlink transmission, respectively, by means of different downlink/uplink configurations. In LTE, there are seven different configurations as shown in FIG. 3.

To avoid significant interference between downlink and uplink transmissions between different cells, neighbor cells should have the same downlink/uplink configuration. Otherwise, uplink transmission in one cell may interfere with downlink transmission in the neighboring cell (and vice versa) as illustrated in FIG. 4 where the uplink transmission of the UE in the right cell is interfering with the downlink reception by the UE in the left cell. As a result, the downlink/uplink asymmetry does not vary between cells. The downlink/uplink asymmetry configuration is signaled as part of the system information and remains fixed for a long period of time.

Heterogeneous networks refer to cellular networks deployed with base stations having different characteristics, mainly in terms of output power, and overlapping in coverage. The term hierarchical cell structures is used to refer to one type of heterogeneous network deployment. One simple example of a heterogeneous network is a macro cell overlaying one or more pico cells.

A characteristic of heterogeneous networks is that the output powers of different cells (partially) covering the same area are different. For example, the output power of a pico base station or a relay might be on the order of 30 dBm or less, while a macro base station might have a much larger output power of 46 dBm. Consequently, even in the proximity of the pico cell, the downlink signal strength from the macro cell can be larger than that of the pico cell.

Cell selection is typically based on received signal strength, i.e., the UE terminal connects to the strongest downlink. However, due to the difference in downlink transmission power between different cells, (e.g., macro and pico), this does not necessarily correspond to the best uplink. From an uplink perspective, it would be better to select a cell based on the uplink path loss as illustrated in FIG. 5 (the inverse of the uplink path loss is illustrated in dashed lines while the solid lines show the received downlink power from both cells/base stations). If uplink path loss is used as the cell selection criterion, the UE transmits uplink using a lower uplink transmit power than if downlink received power is used. This would be beneficial from a capacity perspective since it allows reuse of the radio resources used by one pico cell-connected UE in another pico cell (assuming a sufficient distance between both of these pico cells) because the one pico cell-connected UE's uplink transmission power (and hence interference) can be reduced compared to what it would be if that UE were connected to the macro cell. However, connecting to the best uplink cell is possible, even if the cell selection is based on downlink signal strength measurements, by assigning different measurement offsets to the different cells.

But connecting to the cell with the best uplink does not mean that the best downlink is necessarily used. This condition is sometimes referred to as link imbalance. If the two cells in FIG. 5 transmit on the same frequency, downlink transmissions from the pico cell are subject to strong interference from macro cell downlink transmissions, and in certain regions surrounding the pico base station, it may not be possible for a UE to receive the transmissions from the pico cell. In other words, macro-to-pico downlink interference prevents the UE from receiving from the pico cell.

Solving the uplink-downlink imbalance is important in heterogeneous networks. A simple solution is to operate different overlapping cells or cell "layers" on different (sufficiently separated) frequencies. One approach in situations where different frequencies cannot be used for different cell layers is to employ uplink desensitization by decreasing the receiver sensitivity in the pico base station such that the uplink and downlink cell boundaries coincide, i.e., the shaded area in FIG. 5 surrounding the pico base station shrinks and eventually disappears. In LTE, decreasing the sensitivity is not required because a higher received power can be achieved by proper setting of the power control parameters, i.e., P0. This resolves the problem of receiving downlink transmissions from the pico cell at the cost of using a higher received power target in the pico cell.

Accordingly, time division duplex (TDD) networks use a fixed frame configuration where some subframes are uplink and some are downlink. This prevents or at least limits the flexibility to adopt the uplink/downlink resource asymmetry to varying traffic situations. Heterogeneous deployments typically separate the cell layers in frequency, which comes at a cost in terms of the spectrum required or the use of desensitization to mitigate the link imbalance problem, which artificially decreases uplink performance.

SUMMARY

The technology disclosed herein provides the ability for a subframe to be configured as a "flexible" subframe. As a result, at least three different types of subframes in a TDD system may be configured: a downlink ("DL") subframe, an uplink ("UL") subframe, and a "flexible" subframe.

One non-limiting aspect of the technology relates to a radio network node in a radio communications network and a method related thereto. Data for or from a frame structure is processed that includes one or more downlink subframes preconfigured as a downlink subframe, one or more uplink subframes preconfigured as an uplink subframe, and one or more flexible subframes, where a flexible subframe is dynamically allocated to be an uplink subframe in one instance of a frame and a downlink subframe in another frame instance. Information is generated for a radio terminal indicating how the radio terminal should interpret or use one or more flexible subframes. A receiver receives and processes the information sent by the radio terminal in a flexible subframe, and a transmitter transmits information in a downlink direction using a flexible subframe as a downlink subframe. The base station and the radio terminal may communicate using time division duplex.

In a non-limiting example embodiment, the radio network node exchanges with a neighboring base station information about intended usage of the one or more flexible subframes to avoid inter-cell interference.

If the radio network node provides service to a macro cell in which a pico cell is located, then one option is for the node to determine whether transmitting using a flexible subframe in the macro cell will interfere with transmission in the pico cell. The flexible subframe may be used for either uplink or downlink transmissions when there is no need to protect transmissions in the pico cell during the flexible subframe.

In a non-limiting example embodiment, the radio network node generates information for a radio terminal indicating when a particular flexible subframe should be interpreted or used as an uplink subframe and to instruct the transmit circuitry not to transmit information using the particular subframe. For example, the information indicating when a particular flexible subframe should be interpreted or used as an uplink subframe may be transmitted in a subframe prior to the particular flexible subframe.

One example implementation may transmit feedback signaling only in an uplink or downlink subframe, but preferably not in a flexible subframe. Another example implementation provides for processing information for legacy radio terminals without informing legacy radio terminals of the one or more flexible subframes. Yet another is to vary use of one or more flexible subframes in accordance with a detected traffic demand.

Another non-limiting aspect of the technology relates to a subscriber radio terminal and its operation in a radio communications network. Again, data for or from a frame structure is processed that includes one or more downlink subframes preconfigured as a downlink subframe, one or more uplink subframes preconfigured as an uplink subframe, and one or more flexible subframes, where a flexible subframe is dynamically allocated to be an uplink subframe in one instance of a frame and a downlink subframe in another frame instance. A receiver receives and processes information sent by a base station in a flexible subframe, and a transmitter transmits information in an uplink direction using a flexible subframe as a uplink subframe.

The radio terminal may receive or may already be configured with information indicating when a particular flexible subframe should be interpreted or used as an uplink subframe and then transmit information to the base station using the particular subframe. For example of the former, the information can be received in a flexible subframe prior to the particular flexible subframe. In an example of the latter, all flexible subframes may be assumed as downlink frames unless specific information is communicated to the radio terminal indicating that a particular flexible subframe should be interpreted or used as an uplink subframe.

As above, the radio terminal may also transmit feedback signaling only in an uplink or downlink subframe and not in a flexible subframe and/or vary use of one or more flexible subframes in accordance with traffic demand.

In a non-limiting example implementation, information may be transmitted directly to another radio terminal thereby bypassing the base station using one or more flexible subframes.

DETAILED DESCRIPTION

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its spirit and scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors and/or controllers, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 1:
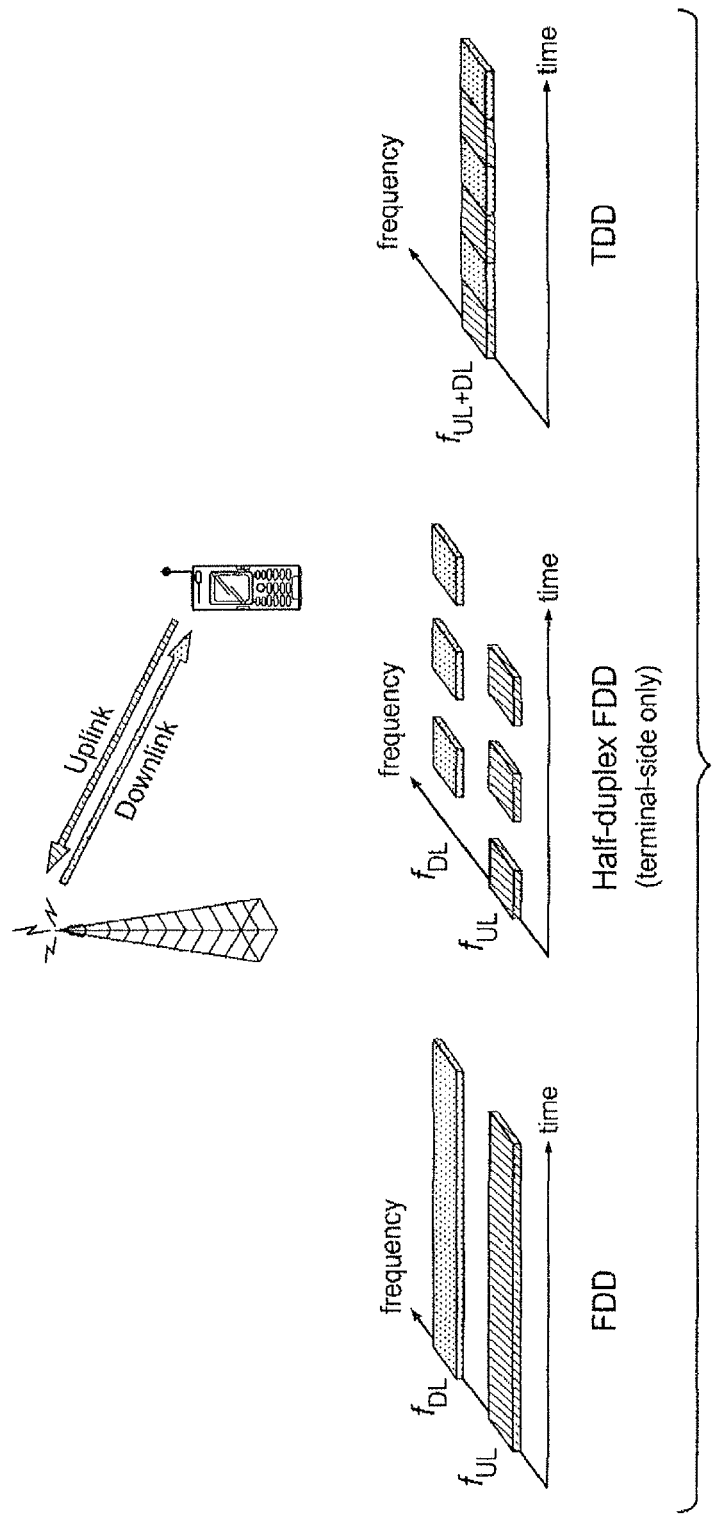
FIG. 1 illustrates frequency division duplex, half-duplex frequency division, and time division duplex transmissions.
Figure 2:
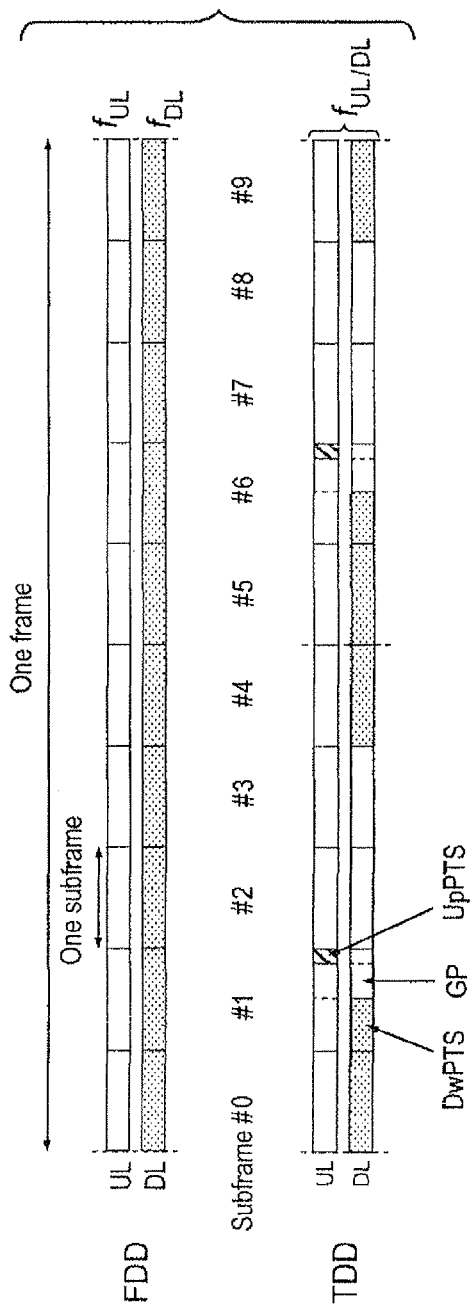
FIG. 2 illustrates uplink/downlink time/frequency structure for LTE separately in the case of frequency division duplex (FDD) and time division duplex (TDD).
Figure 3:
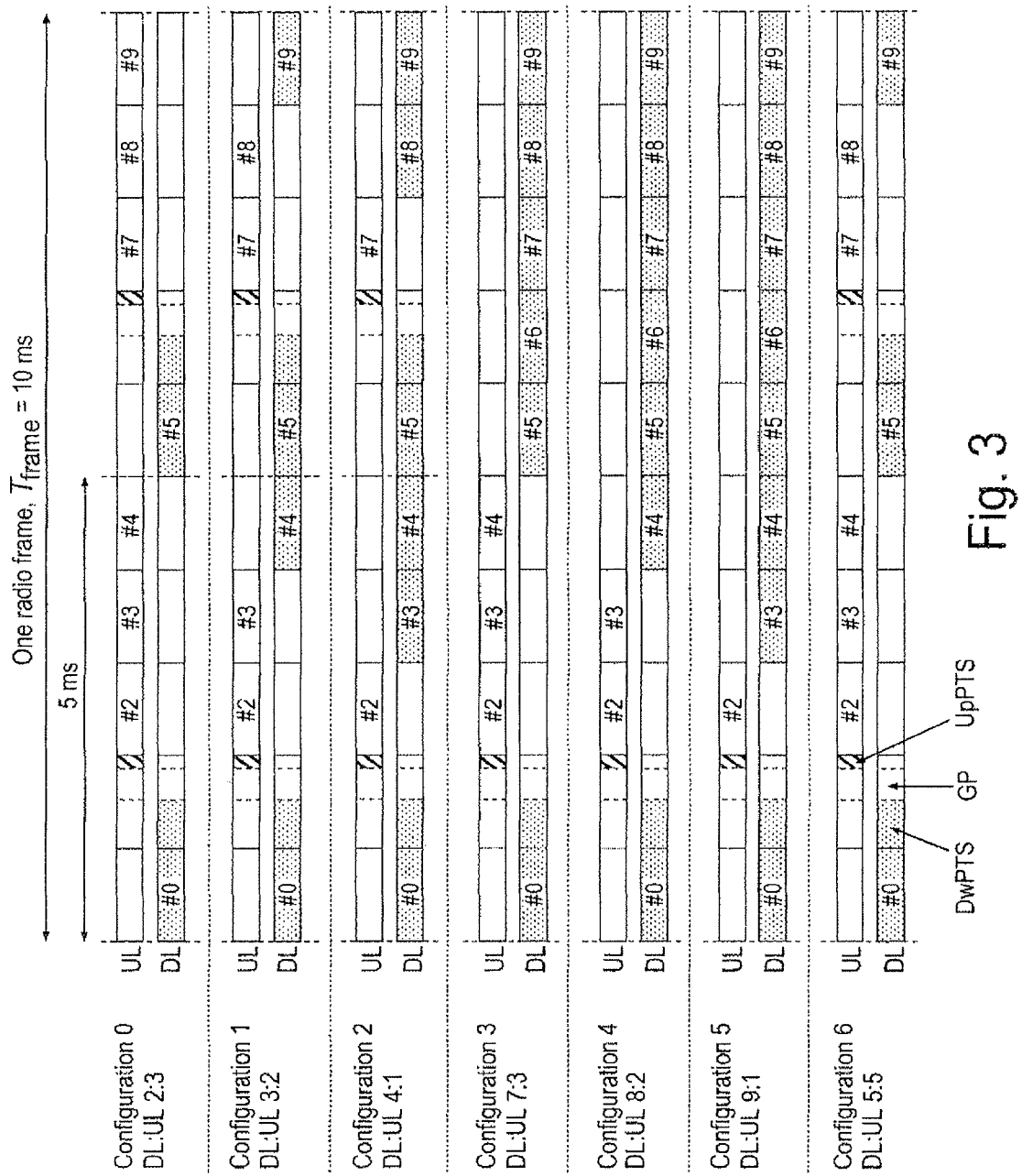
FIG. 3 is a diagram illustrating as an example of seven different downlink/uplink configurations for time division duplex (TDD) in Long Term Evolution (LTE).
Figure 4:
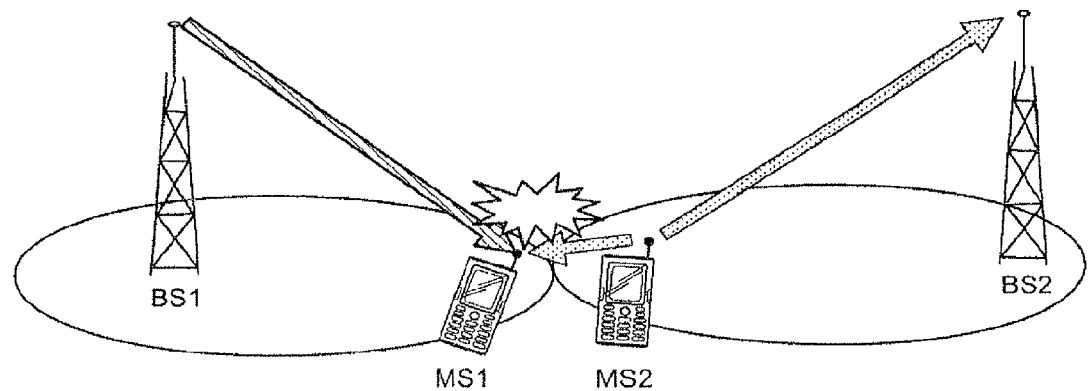
FIG. 4 illustrates an example of uplink/downlink (UL/DL) interference in time division duplex (TDD).

The technology in this application introduces flexible subframes where one or more subframes is flexible because they are not declared or configured in advance as being an uplink subframe or a downlink subframe. This technology is advantageous for example in time division duplex (TDD) based systems, but is not limited to TDD. In other words, a flexible subframe can used for uplink or downlink transmissions as needed or desired. To avoid inter-cell interference like the example shown in FIG. 4, neighboring cells without sufficient inter-cell isolation preferably should not have contradicting usage of the flexible subframes.

Appropriate flexible subframe use may be directed using inter-cell coordination mechanisms where the cells exchange information about their intended usage of the subframes. Base stations can exchange information about their intended usage of the flexible subframes. Consider the example in FIG. 4 with cells 1 and 2 controlled by base stations BS1 and BS2, respectively, with mobile station MS1 is located in cell 1 and mobile station MS2 in cell 2. BS1 may inform BS2 that BS1 intends to use a flexible subframe for uplink transmission from MS1 located close to the cell border between cell 1 and cell 2. BS2 may use this information to avoid scheduling downlink transmissions in the same flexible subframe as this could cause interference to BS1 reception of MS1 and/or the uplink transmission from MS1 could interfere with downlink reception by MS2 in cell 2. Neighboring cells can coordinate their uplink/downlink usage, for example, one radio frame in advance, either by relying on a distributed algorithm implemented in the different base stations and aware of the cell layout and the pathloss, or by relying on a central coordination node such as a radio resource manager.

Figure 6:
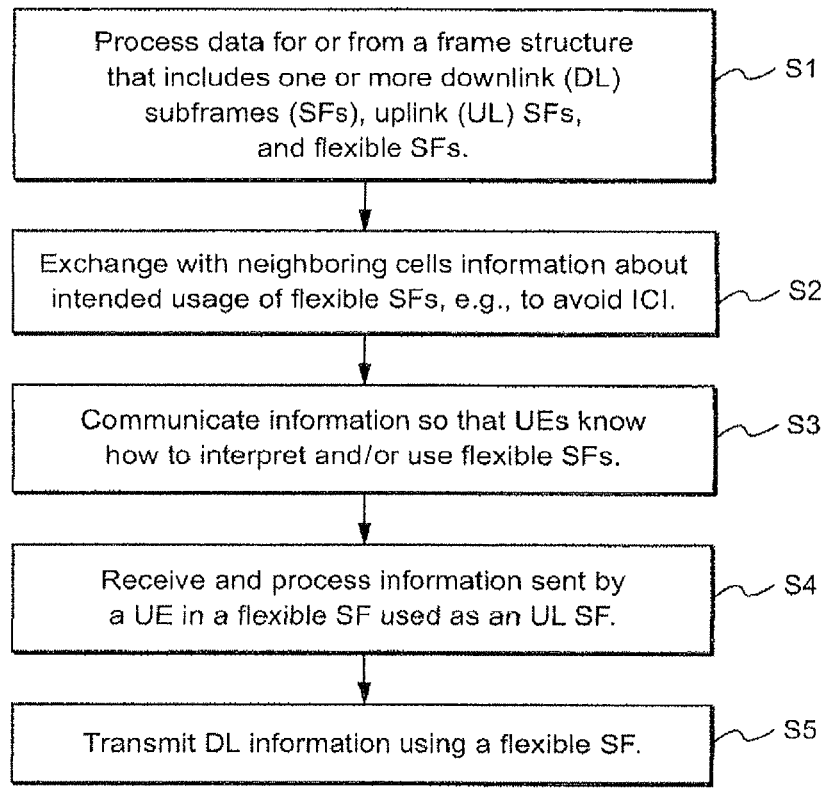
FIG. 6 is a flowchart illustrating non-limiting, example procedures for a base station in a communications system employing flexible subframes.

FIG. 6 is a flowchart illustrating non-limiting, example procedures for a base station in a communications system employing flexible subframes. Initially, the base station processes data for or from a frame structure that includes one or more downlink subframes, uplink subframes, and flexible subframes (step S1). The base station preferably may exchange with base stations of neighboring cells information about intended usage of flexible subframes, e.g., to avoid inter-cell interference (step S2). Information is communicated to the UEs in any suitable way to that the UEs know how to interpret and/or use flexible subframes (step S3). For example, the base station may send explicit subframe related signals to the UE and/or the UE may be programmed in advance to operate based on certain assumptions absent explicit signals relating to flexible subframes. Eventually, the base station receives and processes information sent by a UE in a flexible subframe used as an uplink subframe (step S4). Also eventually, the base station sends downlink information in a flexible subframe (step S5).

Figure 7:
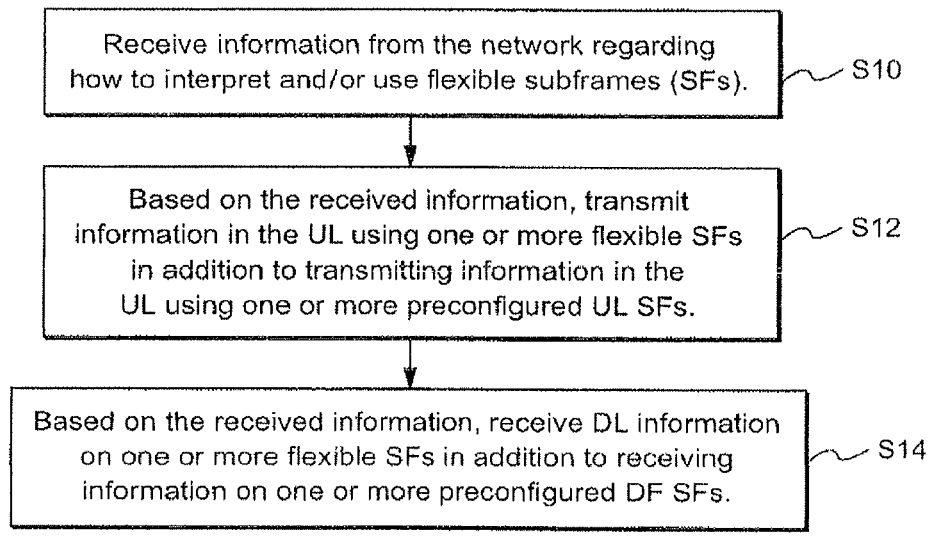
FIG. 7 is a flowchart illustrating non-limiting, example procedures for a UE terminal in a communications system employing flexible subframes.

FIG. 7 is a flowchart illustrating non-limiting, example procedures for a UE terminal in a communications system employing flexible subframes. Initially or on an ongoing basis, the UE receives information from the network (from or via a base station) regarding how to interpret and/or use flexible subframes (step S10). Based on the received information, the UE transmits information in the uplink using one or more flexible subframes in addition to transmitting information in the uplink using one or more preconfigured uplink subframes (step S12). Also, based on the received information, the UE receives information in the downlink on one or more flexible subframes in addition to receiving information in the downlink on one or more preconfigured downlink subframes (step S14).

Figure 8:
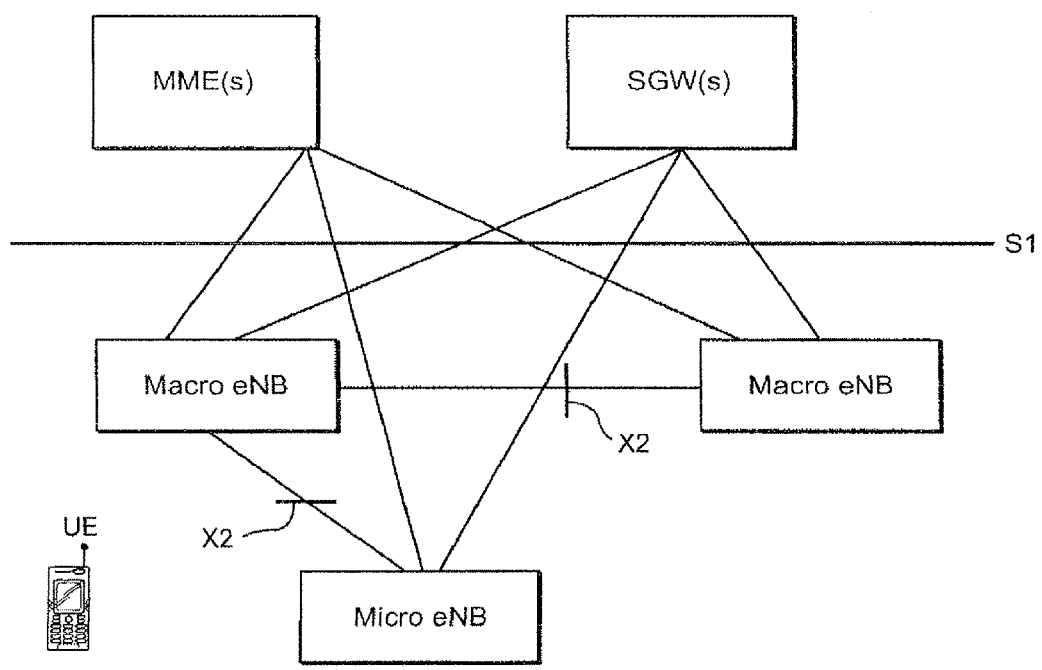
FIG. 8 is a non-limiting example function block diagram of an LTE cellular communications network in which flexible subframes as described herein or encompassed hereby can be utilized and in which inter-cell coordination messages may be sent between eNBs over the X2 interface.

With respect to inter-cell communication/coordination referred above, one way of accomplishing it is as an extension of inter-cell interference coordination provided already in LTE Rel-8. InterCell Interference Coordination (ICIC) in LTE Rel-8 relies on the base stations exchanging messages over the X2 interface. FIG. 8 shows an example diagram of an LTE-based communications system. The core network nodes include one or more Mobility Management Entities (MMEs), a key control node for the LTE access network, and one or more Serving Gateways (SGWs) which route and forward user data packets while and acting as a mobility anchor. They communicate with base stations, referred to in LTE as eNBs, over an S1 interface. The eNBs can include macro and micro eNBs that communicate over an X2 interface. These inter-cell communication/coordination messages are suggestions from one base station to another base station, possibly influencing the scheduling and/or UL and/or DL transmission. Typically these recommendations are valid until further notice. An extension to the inter-cell communication/coordination message may be added to account for flexible subframes, e.g., indicating that the suggestion is for a specific flexible subframe.

Figure 9:
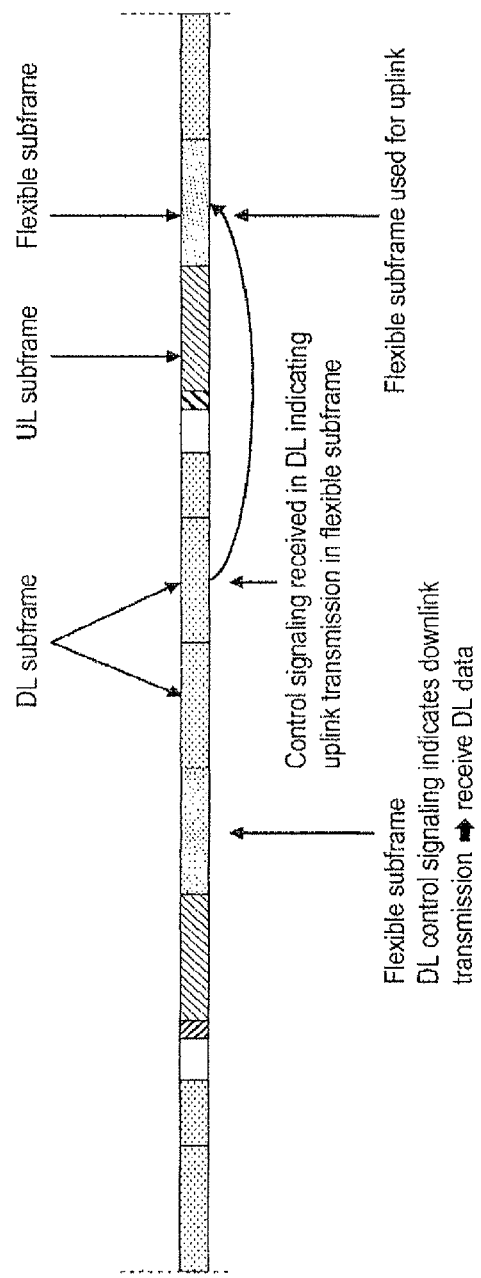
FIG. 9 illustrates, from the perspective of a UE terminal, a non-limiting example scenario using flexible subframes.

One non-limiting example way that flexible subframes can be controlled from a UE perspective is for a UE to receive all flexible subframes in the downlink (they could include downlink data as well as control signaling like that which controls uplink activity) except when the UE is explicitly instructed to transmit in the uplink, as illustrated in example manner in FIG. 9.

In the first flexible subframe in the example of FIG. 9, the radio terminal UE receives downlink control signaling, and if the terminal detects it is the intended receiver for this control information, it follows the received control signaling. The control signaling could (for example) indicate that downlink data transmission should be received in the same subframe, or that the terminal should transmit in a later subframe.

In the second flexible subframe in the example of FIG. 8, the terminal has been instructed to transmit in the uplink. Hence, the wireless terminal will not receive any downlink transmissions in this particular subframe. The instruction to transmit in the uplink could for example be in the form of an explicit grant to transmit data, or implicitly in the form of control signaling as a result of data received in a previous subframe.

The above description concerning FIG. 9 considered flexible subframes only. Flexible subframes can also be combined with traditional, semi-statically allocated uplink and downlink subframes. FIG. 9 illustrates semi-statically allocated uplink and downlink subframes along with the flexible subframes. This combination of flexibly allocated and semi-statically allocated subframes offers several benefits. First, it provides the possibility to extend an already existing time division duplex (TDD) system with flexible subframes where legacy terminals, not able to handle flexible subframes, use the traditional uplink and downlink subframes, while newer terminals can also use the flexible subframes. Second, it can be beneficial to have predefined downlink and uplink subframes, e.g., to transmit system information and provide for random access. Third, semi-statically allocating some subframes to be flexible and dynamically allocating some flexible subframes for uplink and downlink transmissions also benefits control signaling design. In many systems, data received in one transmission direction should be acknowledged by transmitting a signal in the other direction. One non-limiting example of this is hybrid-ARQ acknowledgements in LTE. Since uplink transmissions cannot occur in downlink subframes, (and vice versa), hybrid-ARQ acknowledgements are "postponed" until the next possible uplink subframe. In one example embodiment, these rules may apply only to semi-statically allocated downlink and uplink subframes. Flexible subframes are free to provide feedback signaling in either direction. In a preferred example embodiment, feedback may only be sent in uplink or downlink subframes and not in flexible subframes. In an alternative example embodiment, feedback is sent at a first possibility, i.e., an UL subframe or flexible subframe dynamically used for uplink transmission, and similarly, in the downlink direction, a downlink subframe or flexible subframe dynamically used for downlink transmission.

Figure 10:
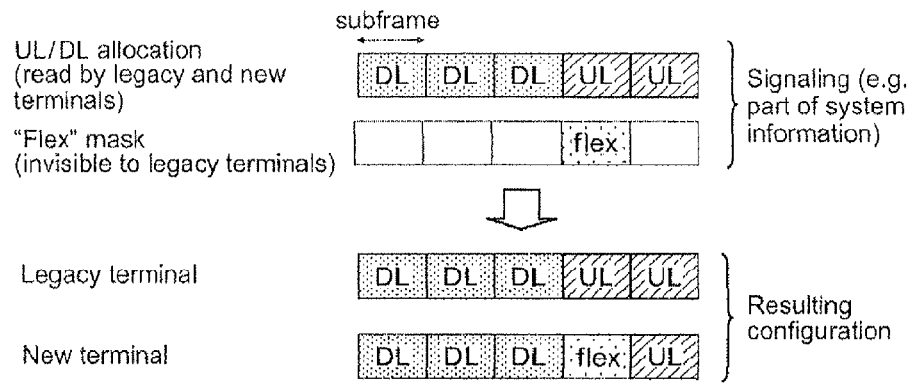
FIG. 10 is a non-limiting example illustrating signaling of flexible frames.

Flexible subframes can be transmitted to inform a UE terminal, e.g., as part of system information, which of the subframes are downlink, uplink, or flexible. However, introducing this approach in an existing system may have an impact on backwards compatibility for legacy terminals. An alternative is to use a legacy mechanism for configuring subframes to be downlink or uplink. For example, in one LTE case, Rel-8 UE terminals could represent legacy UEs and the UL/DL allocation is signaled to as part of the system information. Additional signaling may then inform non-legacy UE terminals which of the previously declared UL subframes are flexible, as illustrated in the example of FIG. 10. If this signaling is "invisible" to legacy UE terminals, they will not expect any transmission from the base station. Nor will they transmit anything in the uplink unless explicitly instructed to do so. Hence, legacy UE terminals will not interfere with new UE terminals using a flexible subframe for downlink or uplink transmission, but can still use the resource for uplink transmissions if instructed to do so by the base station scheduler.

Figure 5:
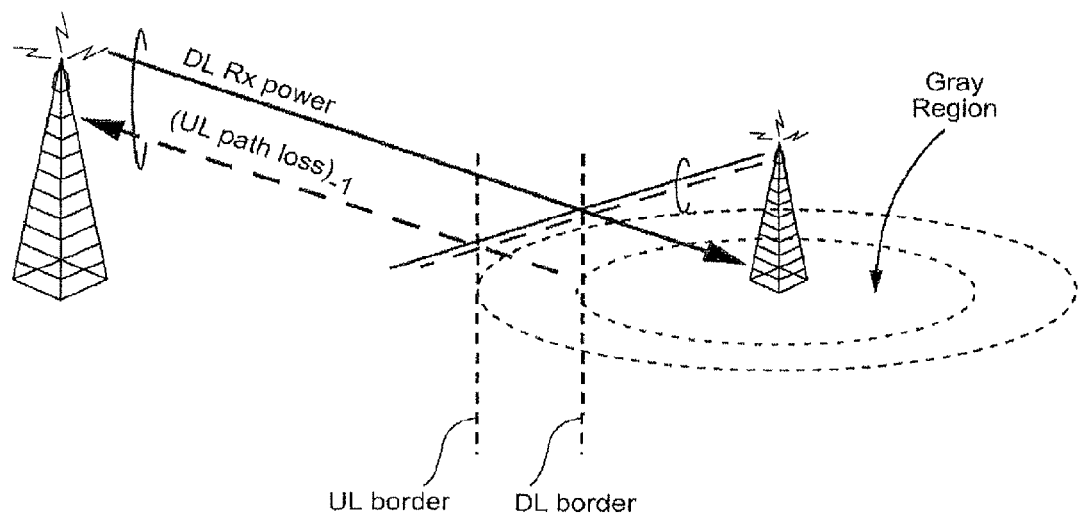
FIG. 5 illustrates an example of uplink and downlink coverage in a mixed cell scenario.
Figure 11:
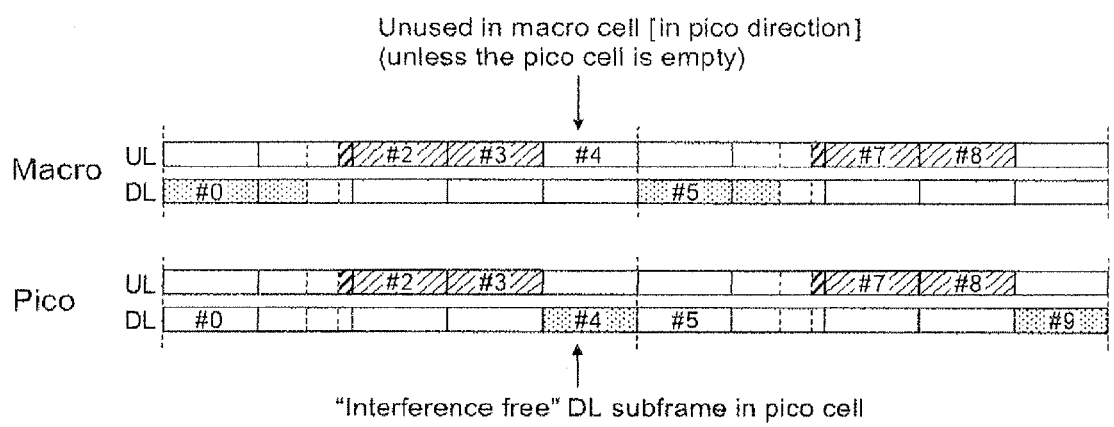
FIG. 11 illustrates an example interference mitigation technique that may be used in heterogeneous networks that employs different uplink-downlink allocations in different cell layers.

In a heterogeneous network, interference from the macro cell can limit the possibility for the terminal to receive transmissions from the pico cell as described in the background section above (see the region between the UL border and the DL border in FIG. 5). Using different uplink-downlink allocations in the macro and the pico cells as illustrated in FIG. 11 provides one possibility to mitigate this in a TDD system. In the macro cell, one or several subframes is allocated for uplink transmission but preferably not used as such for uplink transmissions by terminals connected to the macro cell. In the pico cell, these subframes can advantageously be used for downlink transmissions. Since there is no transmission from the macro cell in these subframes, UE terminals connected to the pico cell will not experience any macro cell interference and can therefore receive the transmissions from the pico cell. Using flexible subframes in this situation can improve resource usage. A flexible subframe in the macro cell provides an "interference-free" subframe in the pico cell. This allows the macro cell to use the flexible subframe (for either uplink or downlink transmissions) when there is no need to protect transmissions in the pico cell, thereby providing a more dynamic resource sharing between the macro and pico cell.

Figure 12A:
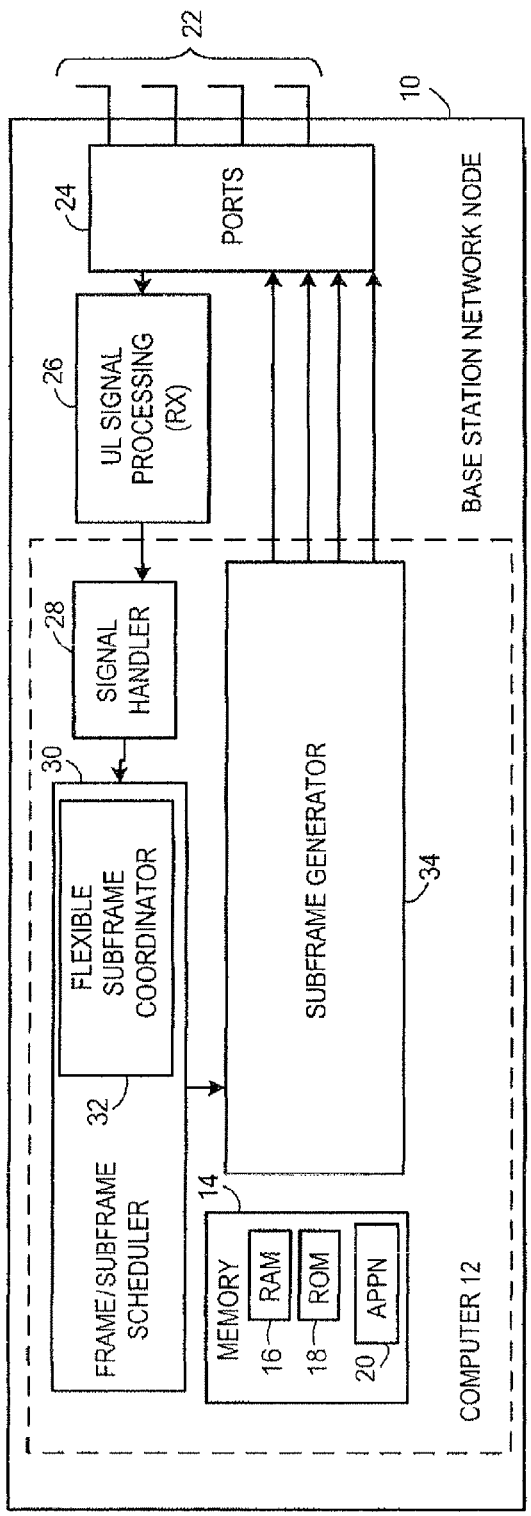
FIGS. 12A and 12B are non-limiting example function block diagrams of a base station and a UE terminal for use in a communications network in which flexible subframes as described herein or encompassed hereby can be utilized.

FIG. 12A shows an example base station node 10 in which flexible subframes as described herein or encompassed hereby can be utilized. The base station 10 communicates with one or more UE terminals 40 over an air interface and includes a frame/subframe scheduler 30 which controls operation of a subframe generator 34. The subframe generator 34 is configured to format and compose subframes which are transmitted on a downlink from base station 10 to the UE terminal 40. The frame/subframe scheduler 30 also includes a flexible subframe coordinator 32 which is configured to implement flexible subframes according to one or more of the example embodiments described herein. Using the flexible subframe coordinator 32, the frame/subframe scheduler 30 determines which subframes of a frame are to be designated as flexible subframes, and controls signaling so that both base station and wireless terminal understand which subframes are flexible subframes.

The base station also includes typical base station hardware like antennas 22 connected to the base station node via antenna ports 24. Received signals are processed in uplink signal processing circuitry 26 to convert the received signal to baseband. The signal handler 28 extracts frames from the received baseband signal for processing by the frame/subframe scheduler 32. The frame/subframe scheduler 30 and subframe generator 34 can be computer-implemented, e.g., by one or more processor(s) or controller(s). A computer 12 is shown with a memory 14 that includes RAM 16, ROM 18, and application programs 20.

Figure 12B:
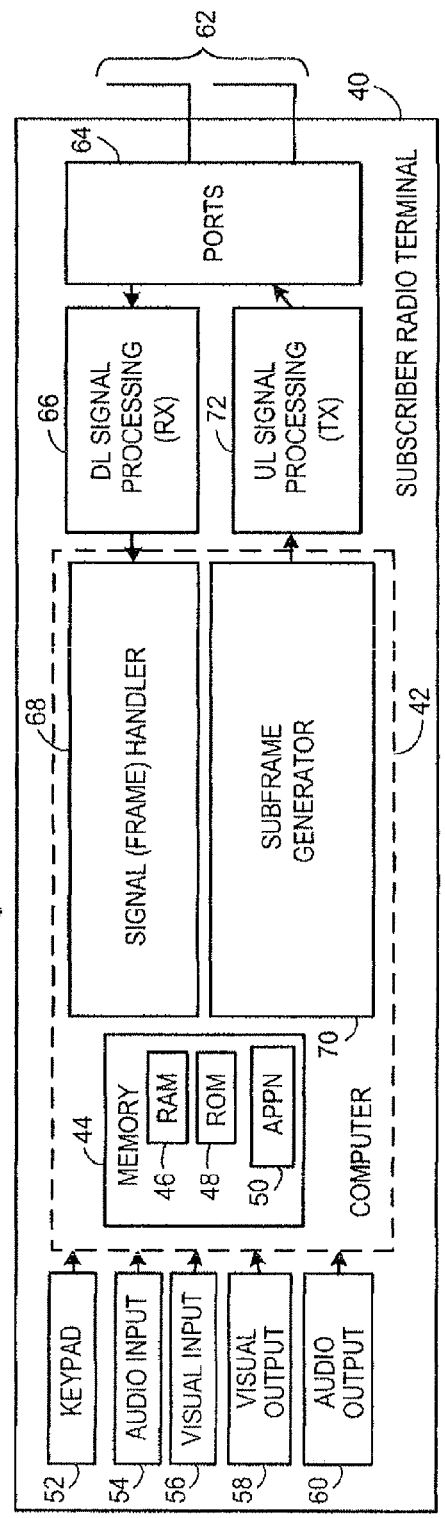

The UE wireless terminal 40 in FIG. 12B includes a subframe generator 70 so that wireless terminal 40 can generate subframes on the uplink (UL) for those frames which are understood to be uplink (UL) subframes, either by permanent designation or as being flexible subframes which are understood from signaling or otherwise are to be used for uplink (UL) transmission. The subframes from the subframe generator 70 are provided to uplink processing circuitry to convert the baseband information into an RF signal which is routed via one or more port 64 to one or more antennas 62 for transmission over the air interface to the base station 10. Downlink signals are received via the one or more antennas 62 and conveyed via the one or more ports 64 to downlink signal processing circuitry that converts the RF signal into baseband. The baseband signal is then provided to signal frame handler 68 for downlink subframe processing in accordance with preconfigured downlink subframes and those flexible subframes designated or assumed to be downlink subframes.

The signal frame handler 68 and subframe generator 70 can be computer-implemented, e.g., by one or more processor(s) or controller(s). A computer 42 is shown with a memory 44 that includes RAM 46, ROM 48, and application programs 50. The wireless terminal may also include typical user interface components like a keypad 52, audio input 54, visual input 56, visual output 58, and audio output 60.

Example benefits and usage scenarios for flexible subframes include but are not limited to flexible UL/DL asymmetry, measurement operations, UE-to-UE communication, and base station discontinuous transmission (DTX). Flexible subframes allow rapid change of the UL/DL asymmetry to meet varying traffic demands. This benefit may be further enhanced when coupled with inter-cell coordination as described above. For measurement operations (e.g., spectrum sensing), the UE terminal cannot expect any downlink transmission in flexible subframes and can therefore not use flexible subframes determining channel measurements on the system the UE is connected to for these flexible subframes; but, the UE may still measure on downlink transmissions on other systems that do not use flexible subframes. Because flexible subframes are not preconfigured as either uplink or downlink subframes, flexible subframes may be used for UE-to-UE communication. And since the UE terminal cannot expect any downlink transmission in flexible subframes, the base station can, if desired, switch off the transmission in those flexible subframes, e.g., to improve the base station energy efficiency or to provide forward compatibility with future enhancements. However, given that the UE terminal may attempt to receive control signaling in flexible subframes, the base station can on a per-subframe basis determine whether a subframe should be DTX'ed or not, which in other words is dynamic adaptation of the number of DTX'ed subframes. An alternative approach of semi-statically allocating bland subframes or near-blank subframes such as MBSFN subframes in LTE Rel-8 is less flexibile.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described here, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A radio terminal for use in a radio communications network, comprising:
   electronic circuitry configured to process data for or from a frame structure that includes one or more downlink subframes preconfigured as a downlink subframe, one or more uplink subframes preconfigured as an uplink subframe, and one or more flexible subframes, where a flexible subframe is dynamically allocated to be an uplink subframe in one instance of a frame and a downlink subframe in another frame instance, wherein the radio terminal is configured to interpret all flexible subframes as downlink subframes unless specific information is communicated to the radio terminal indicating that a particular flexible subframe should be interpreted or used as an uplink subframe;
   receive circuitry configured to:
      receive and process information sent by a base station in a flexible subframe; and
      receive, in a subframe prior to the particular flexible subframe, information indicating when the particular flexible subframe should be interpreted or used as an uplink subframe; and
   transmit circuitry configured to:
      transmit information to the base station in an uplink direction using the particular flexible subframe as a uplink subframe; and
      transmit information directly to another radio terminal thereby bypassing the base station using a second flexible subframe.

2. The radio terminal in claim 1, wherein the base station and the radio terminal communicate using time division duplex.

3. The radio terminal in claim 1, wherein the transmit circuitry is configured to transmit feedback signaling only in a subframe preconfigured as an uplink subframe and not in a flexible subframe.

4. The radio terminal in claim 1, wherein the electronic circuitry is configured to vary use of one or more flexible subframes in accordance with traffic demand.

5. A method for a radio terminal in a radio communications network, comprising:
   processing data, in electronic circuitry, for or from a frame structure that includes one or more downlink subframes preconfigured as a downlink subframe, one or more uplink subframes preconfigured as an uplink subframe, and one or more flexible subframes, where a flexible subframe is dynamically allocated to be an uplink subframe in one instance of a frame and a downlink subframe in another frame instance;
   interpreting all flexible subframes as downlink frames unless specific information is communicated to the radio terminal indicating that a particular flexible subframe should be interpreted or used as an uplink subframe;
   receiving and processing with a receiver information sent by a base station in a flexible subframe;
   receiving, in a subframe prior to the particular flexible subframe, information indicating when a particular subframe should be interpreted or used as an uplink subframe;
   transmitting with a transmitter information to the base station in an uplink direction using the particular flexible subframe as a uplink subframe; and
   transmitting information directly to another radio terminal thereby bypassing the base station using a second flexible subframe.

6. The method in claim 5, wherein the base station and the radio terminal communicate using time division duplex.

7. The method in claim 5, further comprising transmitting feedback signaling only in a subframe preconfigured as an uplink subframe and not in a flexible subframe.

8. The method in claim 5, further comprising varying use of one or more flexible subframes in accordance with traffic demand.

* * * * *